United States Patent
Lin et al.

(10) Patent No.: US 11,682,351 B2
(45) Date of Patent: Jun. 20, 2023

(54) DISPLAY DEVICE, CALIBRATION METHOD AND FRAME DISPLAY METHOD

(71) Applicant: AUO Corporation, Hsin-Chu (TW)

(72) Inventors: Feng-Sheng Lin, Hsin-Chu (TW);
Ching-Sheng Cheng, Hsin-Chu (TW);
Ming-Ci Siao, Hsin-Chu (TW);
Wei-Jen Chen, Hsin-Chu (TW);
Chun-Chi Lai, Hsin-Chu (TW); Yi-Yo Dai, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 17/862,860

(22) Filed: Jul. 12, 2022

(65) Prior Publication Data

US 2023/0136140 A1    May 4, 2023

(30) Foreign Application Priority Data

Oct. 29, 2021    (TW) .................. 110140476

(51) Int. Cl.
*G09G 3/3233* (2016.01)
*G09G 3/20* (2006.01)

(52) U.S. Cl.
CPC ........ *G09G 3/3233* (2013.01); *G09G 3/2007* (2013.01); *G09G 2320/0209* (2013.01); *G09G 2320/0693* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 8,994,617 | B2 | 3/2015 | Chaji |
| 9,041,299 | B2 | 5/2015 | Kimura |
| 10,607,543 | B2 * | 3/2020 | Chaji ................... G06F 1/3218 |
| 2002/0105279 | A1 * | 8/2002 | Kimura .................. G09G 3/14 |
| | | | 315/169.3 |
| 2009/0102439 | A1 | 4/2009 | Williams |
| 2010/0225630 | A1 | 9/2010 | Levey |

(Continued)

FOREIGN PATENT DOCUMENTS

| | | |
|---|---|---|
| TW | I385622 B | 2/2013 |
| TW | I403082 B | 7/2013 |
| TW | I473062 B | 2/2015 |

*Primary Examiner* — Matthew Yeung
(74) *Attorney, Agent, or Firm* — WPAT, P.C

(57) ABSTRACT

A display device includes a display panel, a power integrated circuit, a comparison circuit and a selection circuit. The display panel is configured to receive a system cross voltage. The power integrated circuit is configured to provide the system cross voltage to the display panel and includes a current conversion circuit configured to convert a calibration current outputted by the display panel when displaying a calibration frame into a detection voltage. The comparison circuit is configured to compare the detection voltage with a threshold to generate a comparison result. The selection circuit is configured to determine a magnitude of the system cross voltage according to the comparison result. The power integrated circuit is configured to generate the system cross voltage according to the magnitude of the system cross voltage determined by the selection circuit to provide the system cross voltage to the display panel.

19 Claims, 13 Drawing Sheets

(56) References Cited

U.S. PATENT DOCUMENTS

| | | | |
|---|---|---|---|
| 2011/0080101 A1* | 4/2011 | Chen | H05B 45/48 |
| | | | 315/193 |
| 2011/0227964 A1* | 9/2011 | Chaji | G09G 3/006 |
| | | | 345/82 |
| 2014/0204069 A1 | 7/2014 | Chien | |

* cited by examiner

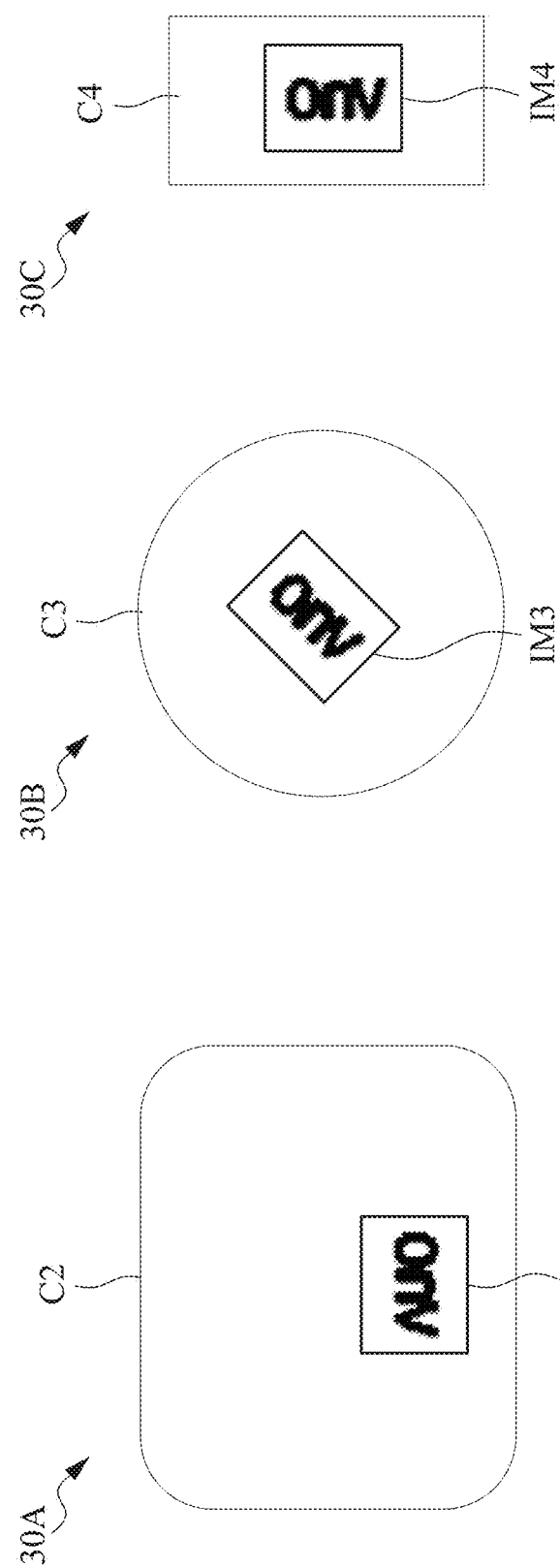

DISPLAY DEVICE, CALIBRATION METHOD AND FRAME DISPLAY METHOD

CROSS-REFERENCE TO RELATED APPLICATION

This application claims priority to Taiwan Application Serial Number 110140476, filed Oct. 29, 2021, which is herein incorporated by reference in its entirety.

BACKGROUND

Field of Invention

This disclosure relates to an electronic device, and in particular to a display device.

Description of Related Art

Following the increase of the usage time, the driving transistor in the pixel circuit may operate in the linear region, which results in the display panel operating abnormally. In order to resolve such problem, prior arts usually increase the voltage difference between the system high voltage and the system low voltage. Although such manner can extend the lifetime of the display panel, unnecessary power consumption is also increased.

SUMMARY

An aspect of present disclosure relates to a display device. The display device includes a display panel, a power integrated circuit, a comparison circuit and a selection circuit. The display panel is configured to receive a system cross voltage. The power integrated circuit is configured to provide the system cross voltage to the display panel and includes a current conversion circuit, wherein the current conversion circuit is configured to convert a calibration current outputted by the display panel when displaying a calibration frame into a detection voltage. The comparison circuit is configured to compare the detection voltage with a threshold to generate a comparison result. The selection circuit is configured to determine a magnitude of the system cross voltage according to the comparison result. The power integrated circuit is further configured to correspondingly generate the system cross voltage according to the magnitude of the system cross voltage determined by the selection circuit to provide the system cross voltage determined by the selection circuit to the display panel.

Another aspect of present disclosure relates to a calibration method. The calibration method is configured to calibrate a system cross voltage of a display device and includes: converting a calibration current outputted by a display panel of the display device when displaying a calibration frame into a detection voltage; comparing the detection voltage with a threshold to generate a comparison result; determining the system cross voltage according to the comparison result; and correspondingly generating the system cross voltage according to the determined system cross voltage to provide the system cross voltage to the display panel.

Another aspect of present disclosure relates to a frame display method. The frame display method is applied to a display device and includes: during a period that a predetermined operation of the display device is performed, displaying at least one frame; in response to a trigger of a cross voltage calibration operation of the display device, displaying a calibration frame before or after displaying the at least one frame; and stopping displaying the calibration frame after the cross voltage calibration operation is completed.

BRIEF DESCRIPTION OF THE DRAWINGS

FIGS. 13A-13C are diagrams that the display panels with different sizes display the calibration frame in accordance with some embodiments of the present disclosure.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
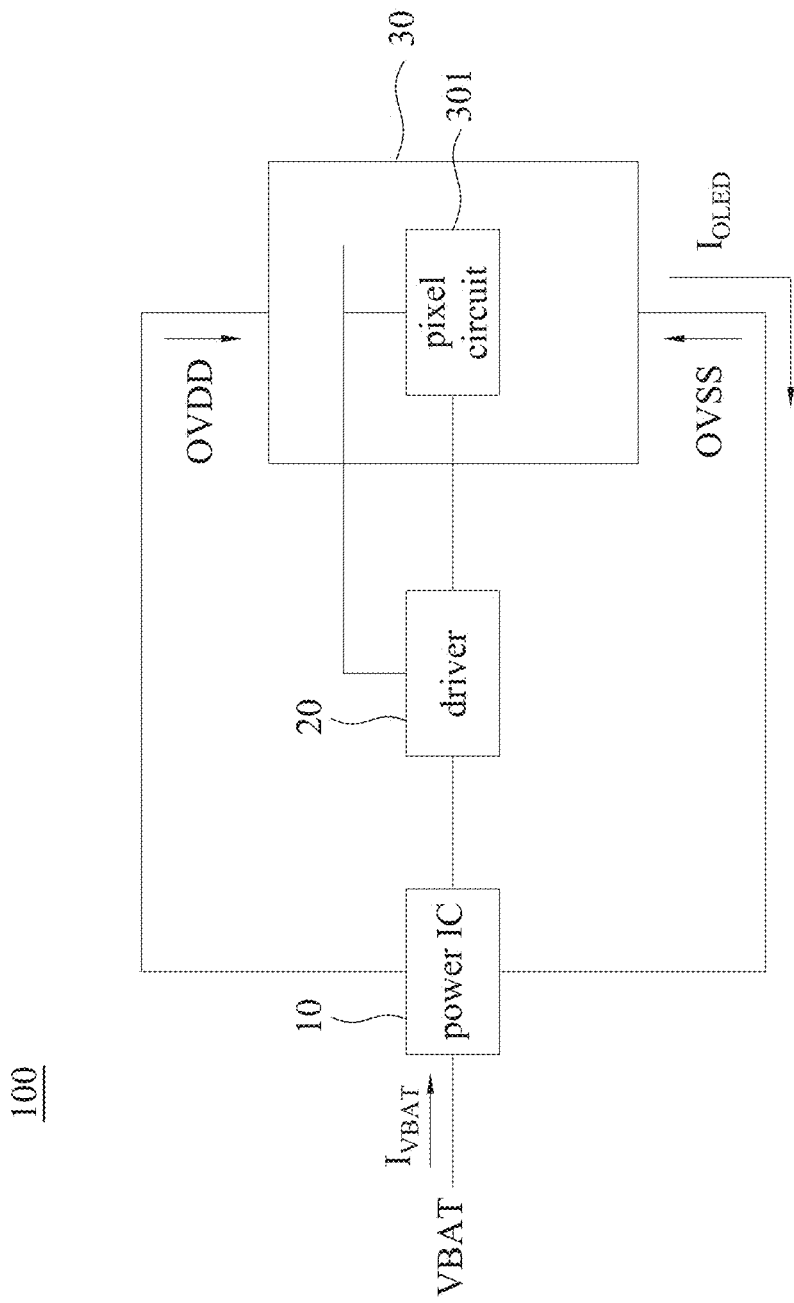
FIG. 1 is block diagram of a display device in accordance with some embodiments of the present disclosure.

Referring to FIG. 1, FIG. 1 is a block diagram of a display device 100 in accordance with some embodiments of the present disclosure. In some embodiments, the display device 100 can be an organic light emitting display (OLED). In particular, the display device 100 includes a power integrated circuit (Power IC) 10, a driver 20 and a display panel 30.

The display panel 30 includes a plurality of pixel circuits 301 arranged in an array (for simplifying descriptions, only one pixel circuit 301 is illustrated in FIG. 1). The driver 20 includes a source driver and a gate driver, wherein the source driver is coupled to the pixel circuits 301 of the display panel 30 through multiple data lines, and the gate driver is coupled to the pixel circuits 301 of the display panel 30 through multiple scan lines. The power integrated circuit 10 is coupled to the driver 20 and is configured to sequentially drive each row of the pixel circuits 301 by the driver 20, so that the display panel 30 displays.

As shown in FIG. 1, the power integrated circuit 10 is further coupled to the display panel 30 and is configured to provide a system cross voltage to the display panel 30, so that the display panel 30 can operate normally. In particular, the system cross voltage is that a system high voltage OVDD minus a system low voltage OVSS.

In some embodiments, the light-emitting brightness of the display panel 30 can be presented as following formula (1):

$$L_{OLED} = \text{Effi}_{(OLED)} \times \text{Effi}_{(PWRIC)} \times \frac{P_{VBAT}}{(OVDD-OVSS)}, \quad (1)$$

where $L_{OLED}$ is the light-emitting brightness, $\text{Effi}_{(OLED)}$ is the light-emitting efficiency of the light-emitting material, $\text{Effi}_{(PWR\ IC)}$ is the power conversion efficiency of the power integrated circuit 10, and $P_{VBAT}$ is the power consumption of the power integrated circuit 10.

It can be appreciated that the light-emitting efficiency $\text{Effi}_{(OLED)}$ and the power conversion efficiency $\text{Effi}_{(PWR\ IC)}$ are difficult to be changed due to the limitation of the specification of the electronic component. Therefore, according to the above formula (1), in the condition that the light-emitting brightness $L_{OLED}$ is fixed, the power consumption $P_{VBAT}$ (that is, a power current $I_{VBAT}$ multiplies a power voltage VBAT) of the power integrated circuit 10 can be reduced by decreasing the system cross voltage (that is, the system high voltage OVDD minus the system low voltage OVSS). In some embodiments, the system cross voltage that the power integrated circuit 10 provides to the display panel 30 is 5.6V. For example, the system high voltage OVDD is 2.8V, and the system low voltage OVSS is −2.8V.

Figure 2:
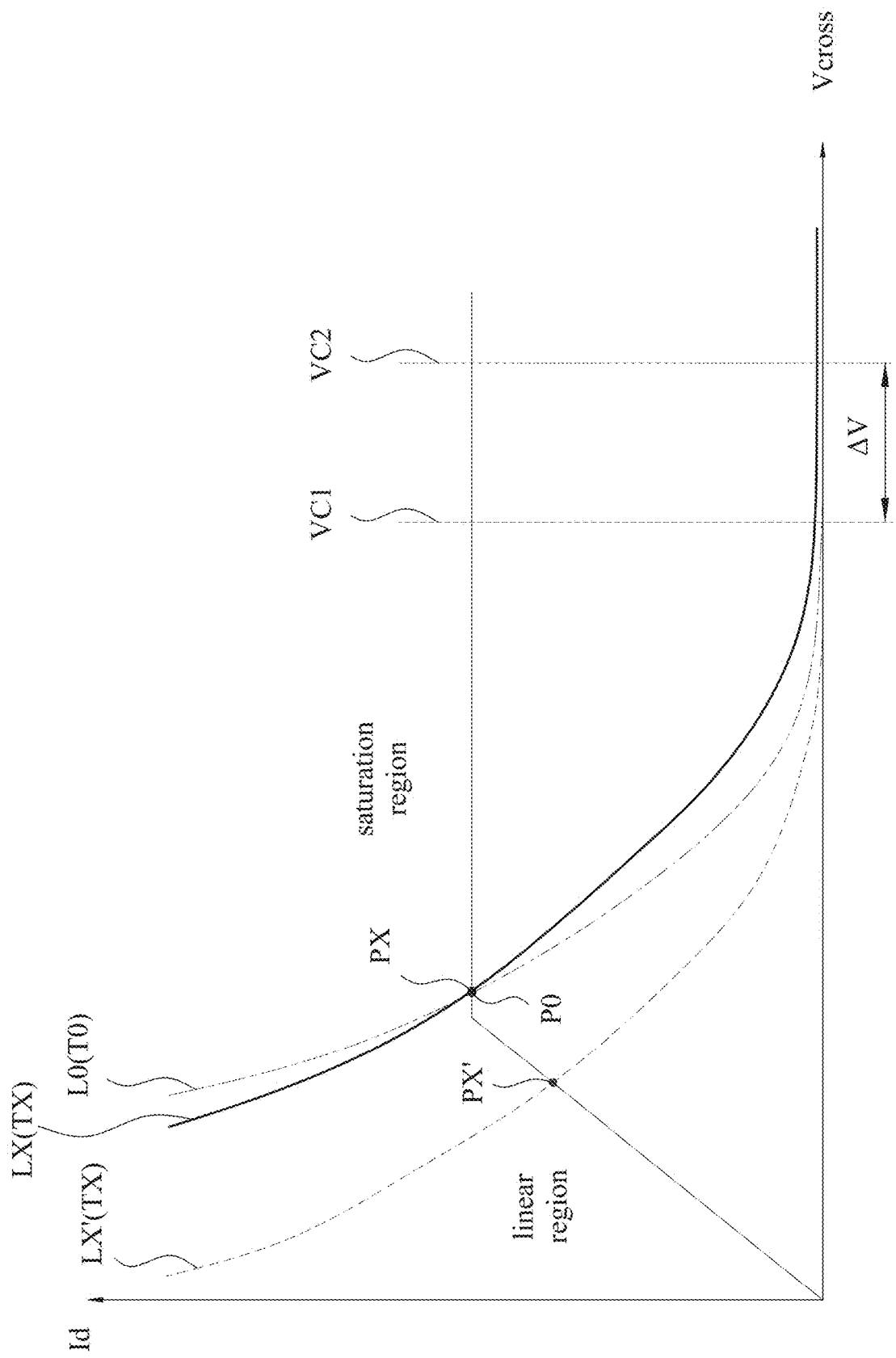
FIG. 2 is a diagram of a characteristic curve drawing the driving current of the pixel circuit to the system cross voltage in accordance with some embodiments of the present disclosure.

Referring to FIG. 2, FIG. 2 is a diagram of a characteristic curve drawing a driving current Id of the pixel circuit 301 to the system cross voltage Vcross. A curve L0 (which is presented by one-dot chain line) represents a characteristic curve at a first time point T0. At the first time point T0, the display device 100 is just activated or awaken, the system cross voltage Vcross is a cross voltage VC1, and an operating point P0 of a driving transistor (not shown) of the pixel circuit 301 is set in the saturation region.

In some embodiments, after the display device 100 operates for a period of time (e.g., from the first time point T0 to a second time point TX), the system cross voltage Vcross is fixed (that is, the system cross voltage Vcross is still the cross voltage VC1 at the second time point TX). As shown in FIG. 2, in the condition that the system cross voltage Vcross is fixed, the curve L0 would change over time and becomes a curve LX' (which is presented by broken line) at the second time point TX. At this time, the operating point PX' of the driving transistor of the pixel circuit 301 leaves the saturation region and enters the linear region, which results in the display panel 30 operating abnormally.

In order to avoid the occurrence of the above condition, in some embodiments, the display device 100 would perform a cross voltage calibration operation to adjust the system cross voltage Vcross appropriately, so that the driving transistor of the pixel circuit 301 would not operate in the linear region. For example, in the embodiments of FIG. 2, the display device 100 would adjust the system cross voltage from the cross voltage VC1 to a cross voltage VC2 before the second time point TX. The cross voltage VC2 is that the cross voltage VC1 plus a voltage difference ΔV. In the condition that the system cross voltage Vcross is adjusted to be the cross voltage VC2, the curve L0 would become a curve LX (which is presented by solid line) at the second time point TX. At this time, the operating point PX of the driving transistor of the pixel circuit 301 is still in the saturation region and hence the display panel 30 can still operate normally.

Figure 12:
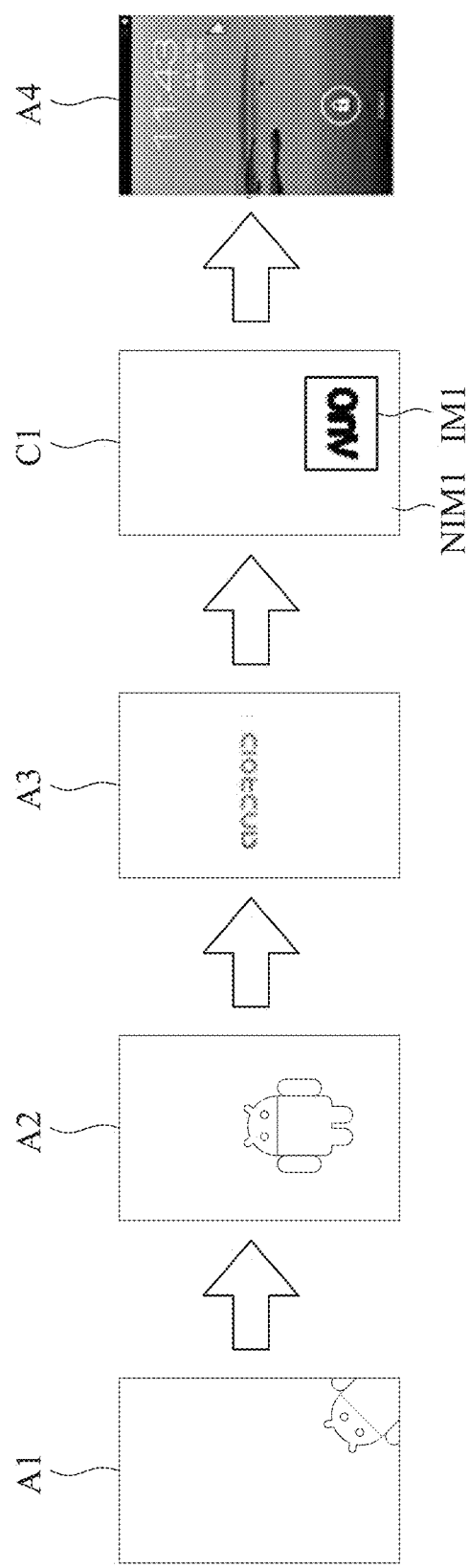
FIG. 12 is a diagram of multiple frames which are displayed chronologically in accordance with some embodiments of the present disclosure.

In some embodiments, the driver 20 can drive the pixel circuits 301 of the display panel 30 to emit light in response to the execution of the cross voltage calibration operation, so that the display panel 30 displays a calibration frame (e.g., "C1" in FIG. 12). The power integrated circuit 10 can determine whether to adjust the system cross voltage Vcross provided to the display panel 30 (i.e., the cross voltage calibration operation) by measuring a calibration current $I_{OLED}$ (as shown in FIG. 1) outputted by the display panel 30 when displaying the calibration frame, so as to decrease the power consumption of the power integrated circuit 10 as much as possible in the condition that the normal operation is ensured for the display panel 30. It can be appreciated that the pixel circuits 301 of the display panel 30 emit light according to the calibration current $I_{OLED}$, so that the display panel 30 displays the calibration frame.

Figure 3:
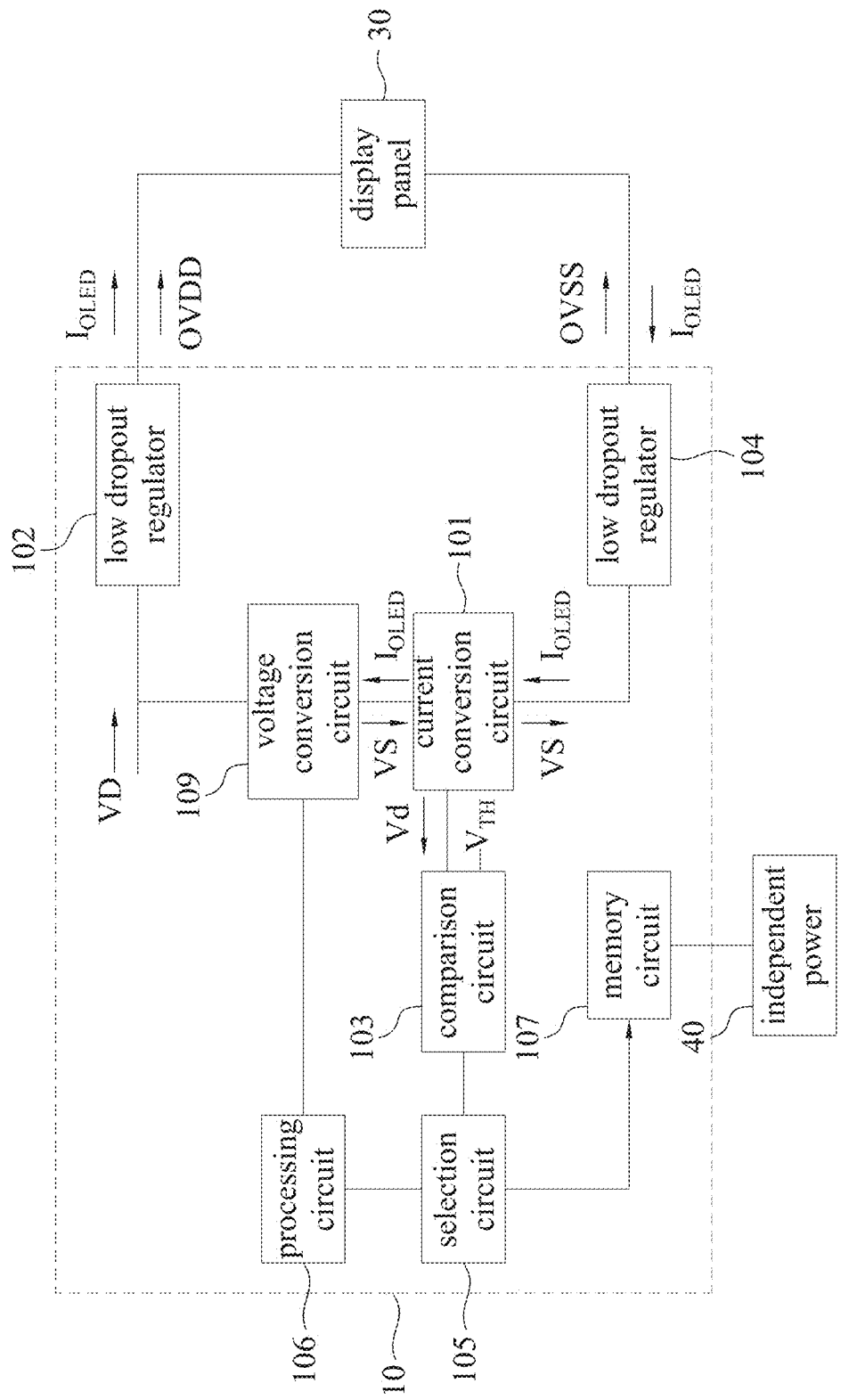
FIG. 3 is a block diagram of the power integrated circuit in accordance with some embodiments of the present disclosure.

Referring to FIG. 3, FIG. 3 is a block diagram of the power integrated circuit 10 in accordance with some embodiments of the present disclosure. In some embodiments, the power integrated circuit 10 includes a current conversion circuit 101, a low dropout regulator 102, a comparison circuit 103, a low dropout regulator 104, a selection circuit 105, a processing circuit 106, a memory circuit 107 and a voltage conversion circuit 109. The power integrated circuit 10 converts an input voltage VD into the system high voltage OVDD by the low dropout regulator 102 and converts an output voltage VS into the system low voltage OVSS by the low dropout regulator 104, so as to provide the system cross voltage Vcross to the display panel 30. The voltage conversion circuit 109 is coupled between an input terminal of the low dropout regulator 102 and an input terminal of the low dropout regulator 104 and is configured to convert the input voltage VD into the output voltage VS. The current conversion circuit 101 is coupled between the voltage conversion circuit 109 and the low dropout regulator 104. The comparison circuit 103 is coupled between the current conversion circuit 101 and the selection circuit 105. The selection circuit 105 is coupled to the comparison circuit 103, the memory circuit 107 and the processing circuit 106. The processing circuit 106 is coupled between the selection circuit 105 and the voltage conversion circuit 109.

It can be appreciated that the calibration current $I_{OLED}$ outputted by the display panel 30 would sequentially flow through the low dropout regulator 104, the current conversion circuit 101, the voltage conversion circuit 109 and the low dropout regulator 102 to input the display panel 30 again.

Figure 4:
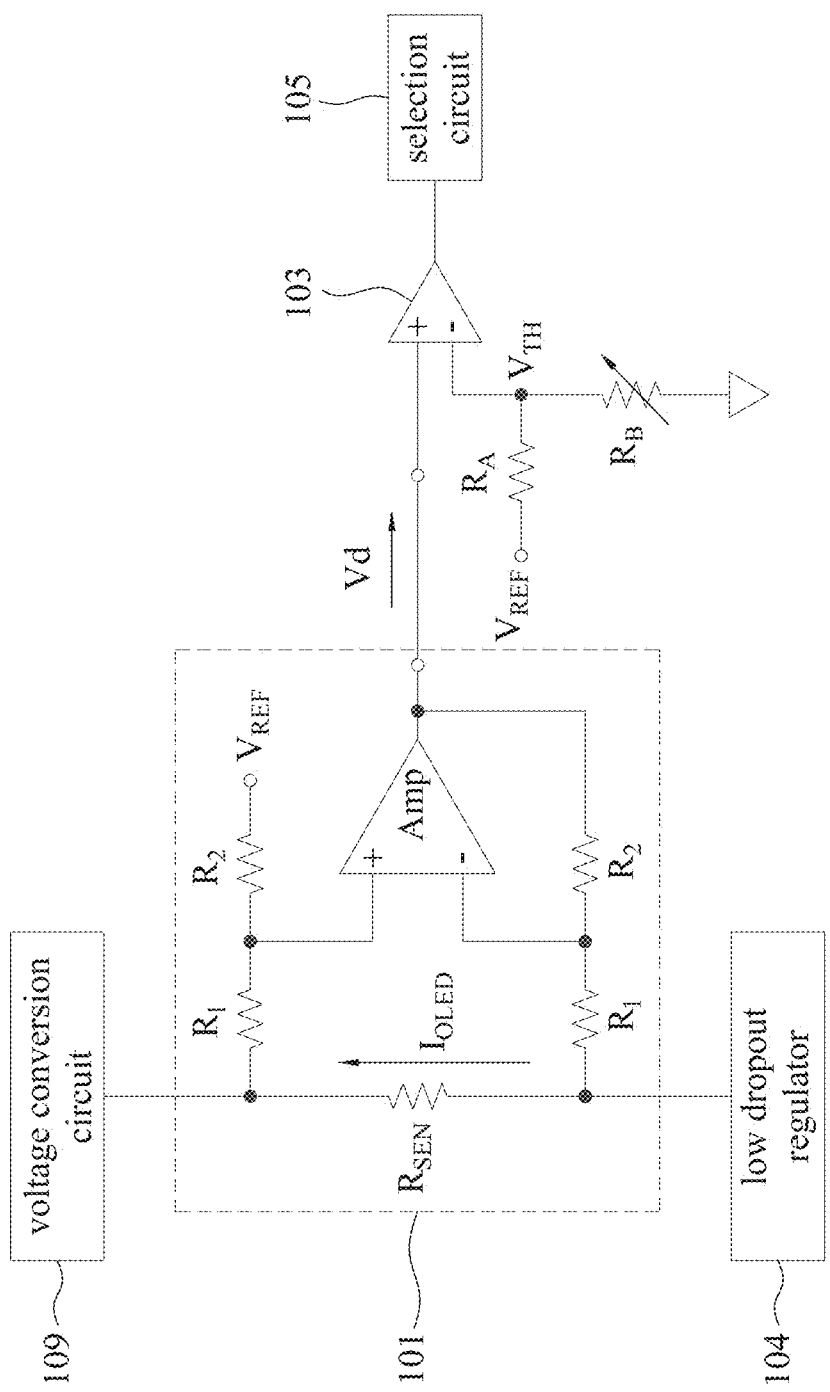
FIG. 4 is a schematic diagram of the current conversion circuit and the comparison circuit in the power integrated circuit in accordance with some embodiments of the present disclosure.

In the cross voltage calibration operation, the current conversion circuit 101 is configured to convert the calibration current $I_{OLED}$ into a detection voltage Vd, and is configured to output the detection voltage Vd to the comparison circuit 103. Referring to FIG. 4, FIG. 4 is a schematic diagram of the current conversion circuit 101 and the comparison circuit 103 in accordance with some embodiments of the present disclosure. In some embodiments, the current conversion circuit 101 can be implemented by an amplifier Amp and a plurality of resistor $R_1$, $R_2$ and $R_{SEN}$, and the calibration current $I_{OLED}$ would flow through the resistor $R_{SEN}$. The detection voltage Vd outputted by the current conversion circuit 101 can be presented as following formula (2):

$$Vd = V_{REF} + \frac{R1}{R2}(V_1 - V_2), \quad (2)$$

where $V_{REF}$ is a reference voltage, R1 is the resistance of the resistor $R_1$, R2 is the resistance of the resistor $R_2$, and $(V_1-V_2)$ is the voltage difference between two terminals of the resistor $R_{SEN}$ (that is, the current value of the calibration current $I_{OLED}$ multiplies the resistance of the resistor $R_{SEN}$).

As shown in FIG. 3, the comparison circuit 103 is configured to compare the detection voltage Vd outputted by the current conversion circuit 101 with a threshold $V_{TH}$ to generate a comparison result. In particular, if the detection voltage Vd is greater than or equal to the threshold $V_{TH}$, the current conversion circuit 101 outputs the logic value (e.g., logic 1) corresponding to the high voltage level. If the detection voltage Vd is smaller than the threshold $V_{TH}$, the current conversion circuit 101 outputs the logic value (e.g., logic 0) corresponding to the low voltage level. However, the present disclosure is not limited herein. In other embodiments, if the detection voltage Vd is greater than or equal to the threshold $V_{TH}$, the current conversion circuit 101 outputs the logic value corresponding to the low voltage level. If the detection voltage Vd is smaller than the threshold $V_{TH}$, the current conversion circuit 101 outputs the logic value corresponding to the high voltage level.

In some embodiments, the threshold $V_{TH}$ is set based on the calibration frame displayed by the display panel 30 under normal operation. As shown in FIG. 4, the threshold $V_{TH}$ can be generated through a bleeder circuit composed of multiple resistors $R_A$ and $R_B$. The threshold $V_{TH}$ can be presented as following formula (3):

$$V_{TH} = \frac{RB}{(RA+RB)}V_{REF}, \quad (3)$$

where RA is the resistance of the resistor $R_A$, RB is the resistance of the resistor $R_B$.

In some embodiments, the resistor $R_B$ can be variable resistor. Accordingly, the threshold $V_{TH}$ can be adjusted by changing the resistance RB of the resistor $R_B$.

As shown in FIG. 3 again, the selection circuit 105 is configured to determine the magnitude of the system cross voltage Vcross according to the comparison result generated by the comparison circuit 103. The processing circuit 106 of the power integrated circuit 10 can control the voltage conversion circuit 109 to generate corresponding output voltage VS (that is, to change the system low voltage OVSS) according to the magnitude of the system cross voltage Vcross determined by the selection circuit 105, so as to generate the system cross voltage Vcross correspondingly. In such way, the power integrated circuit 10 is able to provide the system cross voltage Vcross determined by the selection circuit 105 to the display panel 30.

In some practical applications, as shown in FIG. 4, the resistance of the resistor $R_{SEN}$ is 1 ohm, the resistance R1 of the resistor $R_1$ is 10 ohm, the resistance R2 of the resistor $R_2$ is 1 Mohm, the reference voltage $V_{REF}$ is 1.2V, the threshold $V_{TH}$ is 0.9V and the system cross voltage Vcross is preset to be 5.6V.

At the first time point (e.g., "T0"), the calibration current $I_{OLED}$ outputted by the display panel 30 is 31 mA. According to the calculation of the formula (2), the detection voltage Vd outputted by the current conversion circuit 101 is 0.89V. Since the detection voltage Vd is smaller than the threshold $V_{TH}$, the comparison circuit 103 outputs logic 0. The selection circuit 105 determines to set the system cross voltage Vcross to be 5.6V (that is, determines to maintain the predetermined system cross voltage Vcross) according to logic 0 outputted by the comparison circuit 103. Accordingly, the processing circuit 106 controls the voltage conversion circuit 109 to convert 2.9V of the input voltage VD into −2.9V of the output voltage VS. The low dropout regulator 102 and the low dropout regulator 104 then respectively convert 2.9V of the input voltage VD and −2.9V of the output voltage VS into 2.8V of the system high voltage OVDD and −2.8V of the system high voltage OVSS, so as to maintain the predetermined system cross voltage Vcross.

After a period of time, the calibration current $I_{OLED}$ outputted by the display panel 30 becomes 29 mA at the second time point (e.g., "TX"). According to the calculation of the formula (2), the detection voltage Vd outputted by the current conversion circuit 101 is 0.91V. Since the detection voltage Vd is greater than the threshold $V_{TH}$, the comparison circuit 103 outputs logic 1. The selection circuit 105 determines to set the system cross voltage Vcross to be 6.1V (that is, determines to increase the system cross voltage Vcross) according to logic 1 outputted by the comparison circuit 103. Accordingly, the processing circuit 106 controls the voltage conversion circuit 109 to convert 2.9V of the input voltage VD into −3.4V of the output voltage VS. Again, the low dropout regulator 102 and the low dropout regulator 104 then respectively convert 2.9V of the input voltage VD and −3.4V of the output voltage VS into 2.8V of the system high voltage OVDD and −3.3V of the system high voltage OVSS, so as to adjust the system cross voltage Vcross from 5.6V to 6.1V.

In the above descriptions, the power integrated circuit 10 performs the cross voltage calibration operation at two time points (i.e., "T0" and "TX") respectively and directly adjusts the system cross voltage Vcross from a first value (e.g., 5.6V) to a second value (e.g., 6.1V) when the selection circuit 105 determines to adjust the system cross voltage Vcross from the first value to the second value. However, the present disclosure is not limited herein. In other embodiments, the power integrated circuit 10 can perform the cross voltage calibration operation multiple times during a period, so as to adjust the system cross voltage Vcross from 5.6V to 6.1V in a progressive manner. For example, during the period, the power integrated circuit 10 increases the system cross voltage Vcross by 0.1V every time until the system cross voltage Vcross becomes 6.1V.

Figure 5:
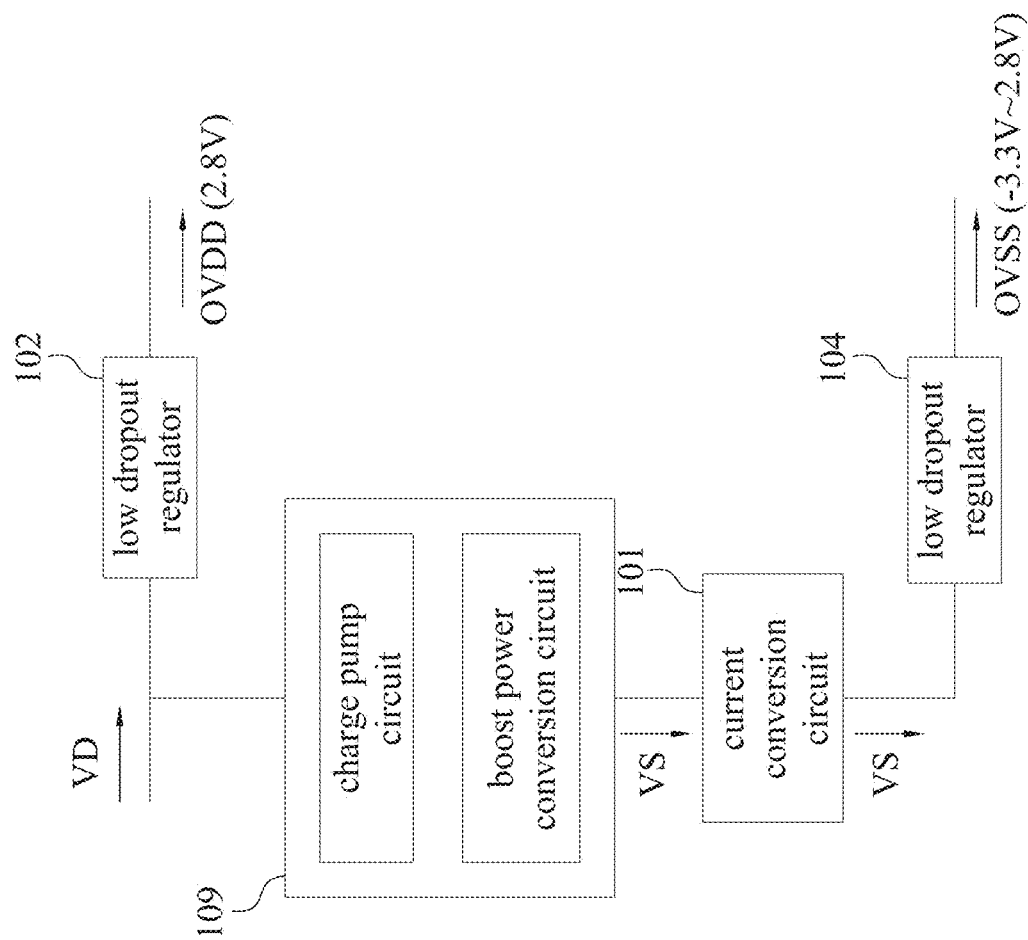
FIG. 5 is a block diagram of the voltage conversion circuit in the power integrated circuit in accordance with some embodiments of the present disclosure.

Referring to FIG. 5, FIG. 5 is a block diagram of the voltage conversion circuit 109 in accordance with some embodiments of the present disclosure. In the above embodiments, the minimal absolute value of the system low voltage OVSS (e.g., −3.3V to −2.8V, −4.2V to −2.8V) is not smaller than the system high voltage OVDD (e.g., 2.8V). In such condition, as shown in FIG. 5, the voltage conversion circuit 109 can be implemented by a charge pump circuit (e.g., a charge pumper inverter) and a boost power conversion circuit. Taking the above value as an example, the charge pump circuit receives and converts the 2.9V of the input voltage VD into −2.9V of voltage. Then, the voltage conversion circuit 109 can directly output −2.9V of voltage as the output voltage VS, or can convert −2.9V of voltage into −3.4V of voltage through the boost power conversion circuit and then output −3.4V of voltage as the output voltage VS.

Figure 6:
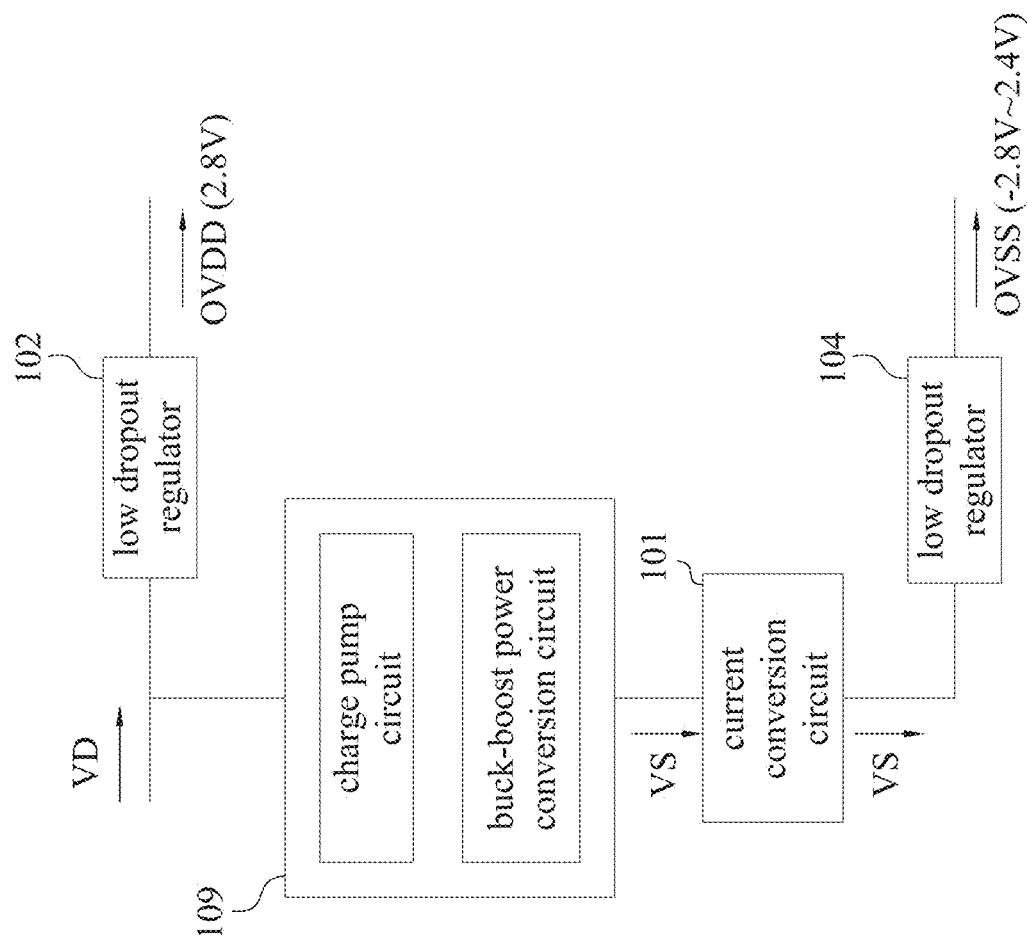
FIG. 6 is a block diagram of the voltage conversion circuit in the power integrated circuit in accordance with other embodiments of the present disclosure.

Referring to FIG. 6, FIG. 6 is a block diagram of the voltage conversion circuit 109 in accordance with other embodiments of the present disclosure. In other embodiments, the minimal absolute value of the system low voltage OVSS (e.g., −3.3V to −2.4V, −3.3V to −1.2V, −4.2V to −1V) is smaller than the system high voltage OVDD (e.g., 2.8V). In such condition, as shown in FIG. 6, the voltage conversion circuit 109 can be implemented by a charge pump circuit (e.g., a charge pumper inverter) and a buck-boost power conversion circuit. For example, the charge pump circuit receives and converts the 2.9V of the input voltage VD into −2.9V of voltage. Then, the voltage conversion circuit 109 can directly output −2.9V of voltage as the output voltage VS, can convert −2.9V of voltage into −2.5V of voltage through the buck-boost power conversion circuit and then output −2.5V of voltage as the output voltage VS, or can convert −2.9V of voltage into −3.4V of voltage through the buck-boost power conversion circuit and then output −3.4V of voltage as the output voltage VS.

As shown in FIG. 3 again, in some embodiments, the memory circuit 107 is configured to store the magnitude of the system cross voltage Vcross determined by the selection circuit 105. Therefore, in some conditions (for example, the display device 100 is not triggered to perform the cross voltage calibration operation), the power integrated circuit 10 can directly set the system cross voltage Vcross to have the previously determined magnitude according to the data stored in the memory circuit 107.

In the embodiments of FIG. 3, the memory circuit 107 is further coupled to an independent power 40. When the display device 100 requires stopping the operation of the power integrated circuit 10 temporarily due to restarting or operating in a power saving mode, the memory circuit 107 can maintain the operation through the power supply from the independent power 40. In such way, when the display device 100 returns to operate in a normal mode, the power integrated circuit 10 can directly set according to the data stored in the memory circuit 107 and therefore does not require to perform the cross voltage calibration operation again.

In the above embodiments, the power integrated circuit 10 performs the cross voltage calibration operation one time to obtain one suitable system cross voltage Vcross (e.g., 5.6V, 6.1V) only. However, the present disclosure is not limited herein. In other embodiments, the display device 100 can operate in the normal mode or the power saving mode, and the power integrated circuit 10 performs the cross voltage calibration operation one time to obtain two system cross voltages Vcross suitable for two operation modes. In particular, if the selection circuit 105 determines that the system cross voltage Vcross is a first value when the display device 100 operate in the normal mode, the selection circuit 105 can further determine the system cross voltage Vcross is a second value when the display device 100 operate in the power saving mode based on a predetermined voltage difference. For example, the selection circuit 105 obtains the second value (e.g., 5.2V) by subtracting the predetermined voltage difference (e.g., 0.4V) from the first value (e.g., 5.6V).

The arrangement of the current conversion circuit 101, the comparison circuit 103, the selection circuit 105 and the memory circuit 107 of the present disclosure is not limited to those of FIG. 3. Multiple arrangements of the current conversion circuit 101, the comparison circuit 103, the selection circuit 105 and the memory circuit 107 would be described in detail below with reference to FIGS. 7-9.

Figure 7:
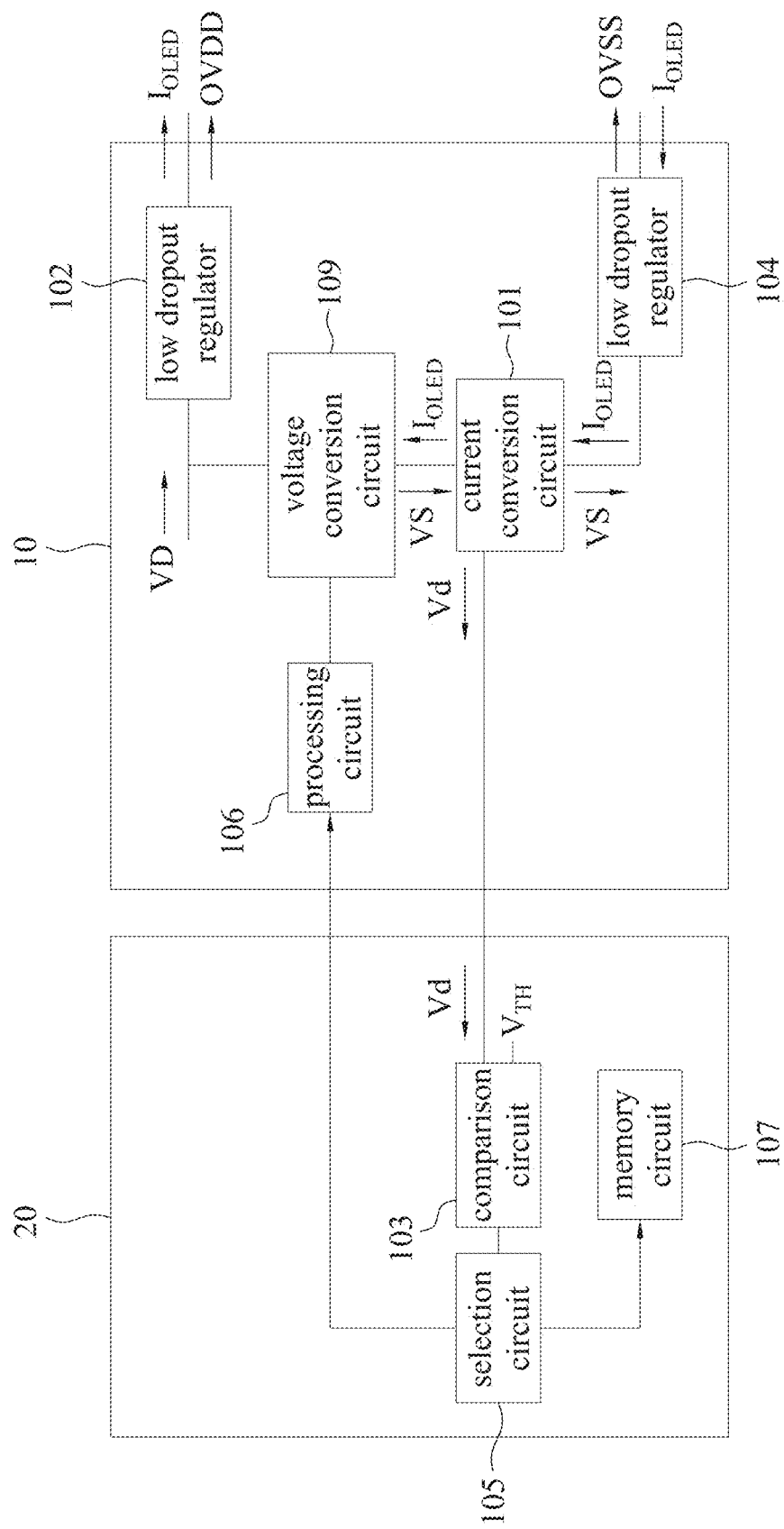
FIG. 7 is a block diagram of the power integrated circuit and the driver in accordance with other embodiments of the present disclosure.

Referring to FIG. 7, FIG. 7 is a block diagram of the power integrated circuit 10 and the driver 20 in accordance with other embodiments of the present disclosure. In the embodiments of FIG. 7, the current conversion circuit 101 is arranged in the power integrated circuit 10, and the comparison circuit 103, the selection circuit 105 and the memory circuit 107 are arranged in the driver 20. In such arrangement, the independent power 40 in FIG. 3 can be omitted, because the memory circuit 107 can still receive the power supply by the driver 20 even if the power integrated circuit 10 stops operating temporarily. The other arrangements and operations of the embodiments of FIG. 7 are similar to those of the above embodiments, and therefore the descriptions thereof are omitted herein.

Figure 8:
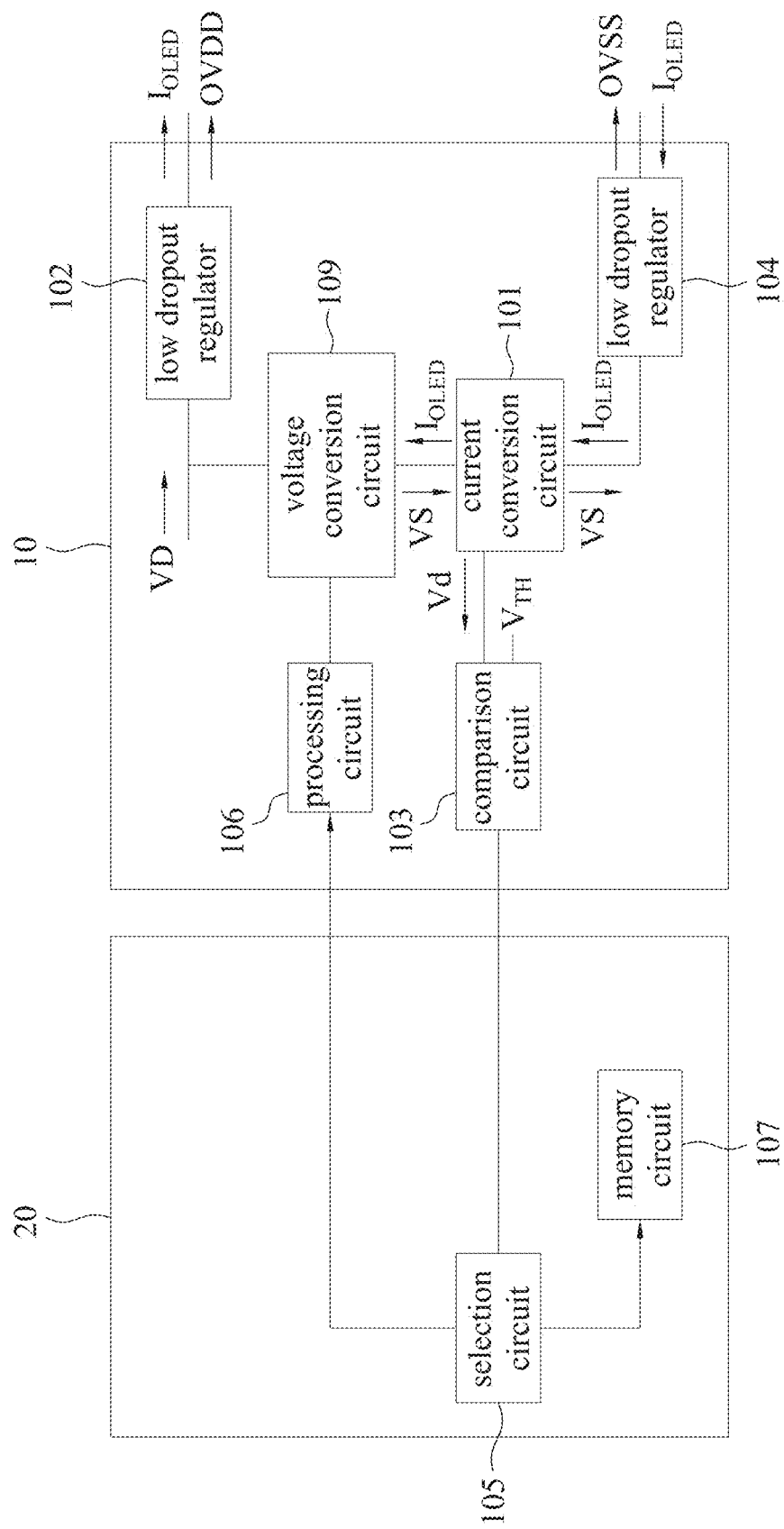
FIG. 8 is a block diagram of the power integrated circuit and the driver in accordance with other embodiments of the present disclosure.

Referring to FIG. 8, FIG. 8 is a block diagram of the power integrated circuit 10 and the driver 20 in accordance with other embodiments of the present disclosure. In the embodiments of FIG. 8, the current conversion circuit 101 and the comparison circuit 103 are arranged in the power integrated circuit 10, and the selection circuit 105 and the memory circuit 107 are arranged in the driver 20. In such arrangement, in addition to omitting the independent power 40 in FIG. 3, it can also avoid analog signals (e.g., the detection voltage Vd outputted by the current conversion circuit 101) being transmitted between the power integrated circuit 10 and the driver 20. The other arrangements and operations of the embodiments of FIG. 8 are similar to those of the above embodiments, and therefore the descriptions thereof are omitted herein.

Figure 9:
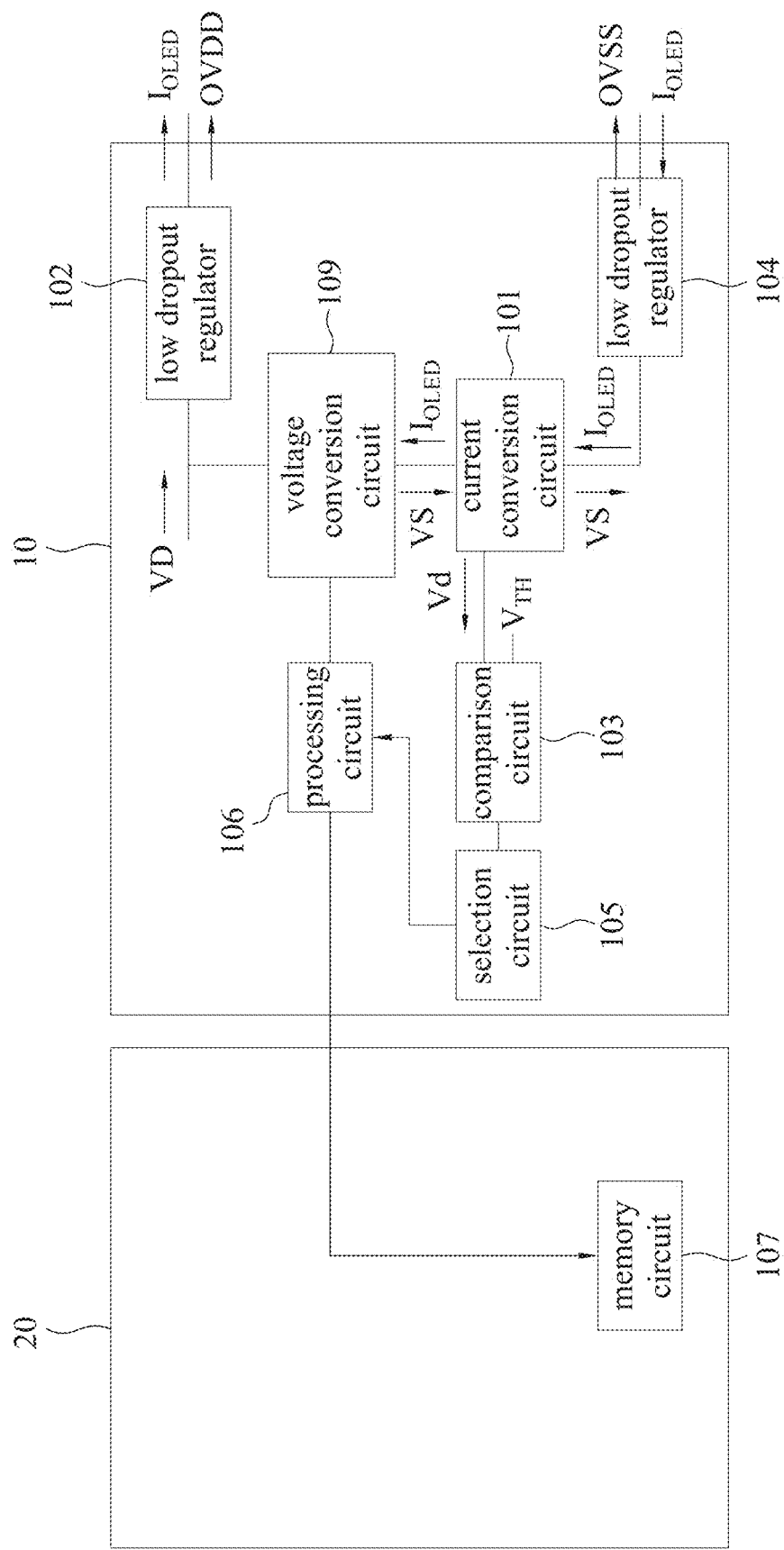
FIG. 9 is a block diagram of the power integrated circuit and the driver in accordance with other embodiments of the present disclosure.

Referring to FIG. 9, FIG. 9 is a block diagram of the power integrated circuit 10 and the driver 20 in accordance with other embodiments of the present disclosure. In the embodiments of FIG. 9, the current conversion circuit 101, the comparison circuit 103 and the selection circuit 105 are arranged in the power integrated circuit 10, and the memory circuit 107 is arranged in the driver 20. In such arrangement, in addition to omitting the independent power 40 in FIG. 3, it can also decrease signal transmission between the power integrated circuit 10 and the driver 20, so that the cross voltage calibration operation can be performed multiple times in a period of time. The other arrangements and operations of the embodiments of FIG. 9 are similar to those of the above embodiments, and therefore the descriptions thereof are omitted herein.

Figure 10:
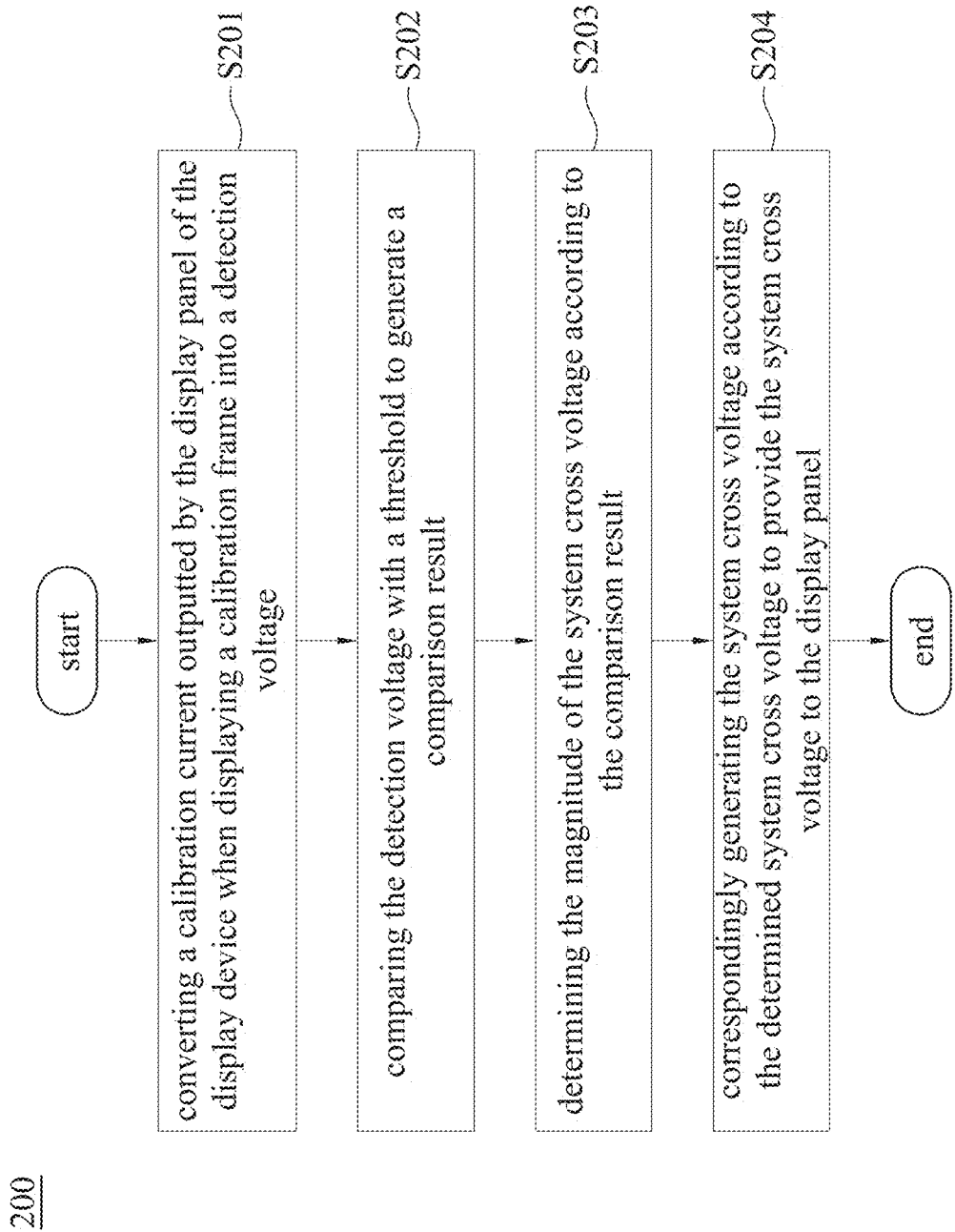
FIG. 10 is a flow diagram of a calibration method in accordance with some embodiments of the present disclosure.

Referring to FIG. 10, FIG. 10 is a flow diagram of a calibration method 200 in accordance with some embodiments of the present disclosure. The calibration method 200 can be executed by the display device 100 to calibrate the system cross voltage Vcross provided to the display panel 30, but the present disclosure is not limited herein. As shown in FIG. 10, the calibration method 200 includes steps S201-S204. For convenience of description, the calibration method 200 would be described below with reference to FIGS. 1 and 3.

In step S201, the calibration current $I_{OLED}$ outputted by the display panel 30 of the display device 100 when displaying the calibration frame (e.g., "C1" in FIG. 12) is converted into the detection voltage Vd.

In step S202, the detection voltage Vd is compared with a threshold $V_{TH}$ to generate a comparison result (e.g., logic 1, logic 0).

In step S203, the magnitude of the system cross voltage Vcross is determined according to the comparison result (which is generated in step S202).

In step S204, the system cross voltage Vcross is correspondingly generated according to the magnitude of the determined system cross voltage Vcross to provide the determined system cross voltage Vcross to the display panel 30.

Steps S201-S204 of the calibration method 200 are same or similar to the operations of the display device 100, and therefore descriptions thereof are omitted herein.

Figure 11:
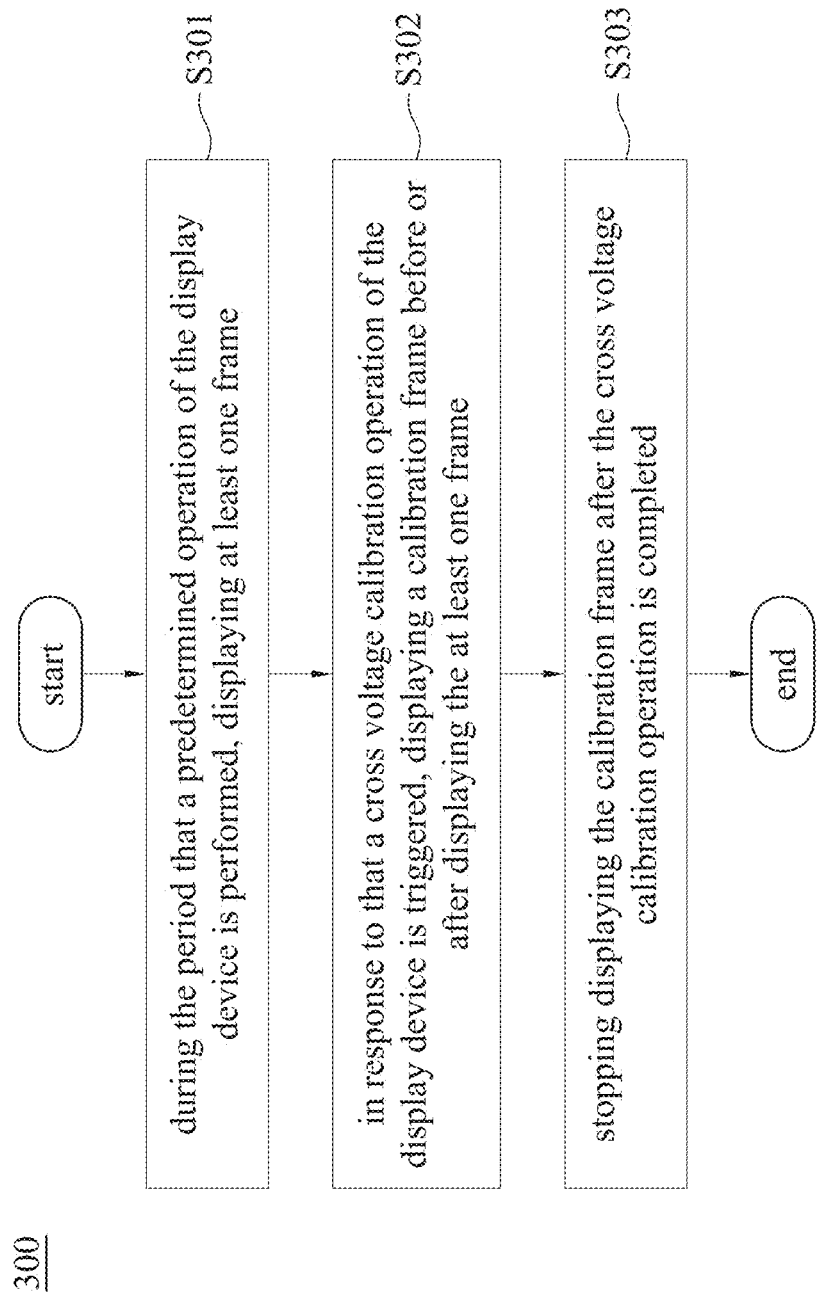
FIG. 11 is a flow diagram of a frame display method in accordance with some embodiments of the present disclosure.

Referring to FIG. 11, FIG. 11 is a flow diagram of a frame display method 300 in accordance with some embodiments of the present disclosure. The frame display method 300 is applied to the display device 100 in the above embodiments, but the present disclosure is not limited herein. As shown in FIG. 11, the frame display method 300 includes steps S301-S303. For convenience of description, the frame display method 300 would be described below with reference to FIGS. 1, 3 and 12. FIG. 12 is a diagram of multiple frames which are displayed chronologically in accordance with some embodiments of the present disclosure.

In step S301, at least one frame is displayed during a period that a predetermined operation of the display device 100 is performed. For example, when the display device 100 is booted or restarted (i.e., the predetermined operation), the display device 100 displays a plurality of boot frames A1-A4 (i.e., the at least one frame) as shown in FIG. 12 by the display panel 30 to remind the user that the display device 100 is booting. As shown in FIG. 12, the boot frames A1-A4 would be displayed according to the timing. In other words, the boot frame A2 would be displayed after the display of the boot frame A1 is completed, the boot frame A3 would be displayed after the display of the boot frame A2 is completed, and the boot frame A4 would be displayed after the display of the boot frame A3 is completed. In addition, each of the boot frames A1-A4 can be a static image or a dynamic image.

In step S302, a calibration frame C1 is displayed before or after the at least one frame is displayed in response to an execution of a cross voltage calibration operation of the display device 100. In some embodiments, the display device 100 can be preset to perform the cross voltage calibration operation at a specific time point. For example, the specific time point is during a period that the display device 100 is booting or restarting. Accordingly, during the period that the display device 100 is booting or restarting, the display device 100 would display the calibration frame C1 at the specific time point so as to perform the cross voltage calibration operation. As shown in FIG. 12, the display device 100 displays the calibration frame C1 after displaying the boot frame A3 (or before displaying the boot frame A4), but the present disclosure is not limited herein.

In step S303, the display of the calibration frame C1 is stopped after the cross voltage calibration operation is completed. As shown in FIG. 12, after the cross voltage calibration operation is completed, the display device 100 stops displaying the calibration frame C1 and then displays the boot frame A4. However, the present disclosure is not limited herein. In other embodiments, when the current conversion circuit 101 receives the calibration current $I_{OLED}$ outputted by the display panel 30 when displaying the calibration frame C1, the display device 100 can stop displaying the calibration frame C1 immediately.

The embodiments of FIG. 12 are only for illustrated purpose and are not intended to limit the present disclosure. For example, in some embodiments, the cross voltage calibration operation is set to be manually triggered by the user to perform. Accordingly, the display device 100 can display the calibration frame C1 in response to the execution of the cross voltage calibration operation during a period of the normal or daily operation of the user (i.e., the predetermined operation).

In addition, as shown in FIG. 12, the calibration frame C1 includes an image area IM1 and a non-image area NIM1. In some embodiments, at least a portion of pixels in the image area IM1 has a data value corresponding to a predetermined gray level (e.g., B225) which allows the operating point of the driving transistor to enter the linear region easily. All of pixels in the non-image area NIM1 have a data value corresponding to a lowest gray level (e.g., 0), wherein the predetermined gray level is different from the lowest gray level.

Referring to FIGS. 13A-13C, FIGS. 13A-13C are diagrams that multiple display panels 30A-30C with different sizes display the calibration frame in accordance with some embodiments of the present disclosure. As shown in FIGS. 13A-13C, the display panels 30A-30C are different from each other in shape and size. Accordingly, multiple calibration frames C2-C4 displayed by the display panels 30A-30C also have different sizes.

Notably, the image area IM1 in the calibration frame C1 (as shown in FIG. 12), the image area IM2 in the calibration frame C2, the image area IM3 in the calibration frame C3 and the image area IM4 in the calibration frame C4 have the same size. Because the image areas IM1-IM4 have the same size (which means that the numbers of pixel circuits emitting light in the display panels 30 and 30A-30C are the same), the calibration current $I_{OLED}$ outputted by the display panel 30 when displaying the calibration frame C1, the calibration current outputted by the display panel 30A when displaying the calibration frame C2, the calibration current outputted by the display panel 30B when displaying the calibration frame C3 and the calibration current outputted by the display panel 30C when displaying the calibration frame C4 are the same in the normal condition. In such way, the threshold VTH which is set based on the calibration frame (e.g., "C1-C4") displayed by the display panel can be applied to multiple display panels with different sizes at once instead of setting the display panels one by one according to the size of each display panel.

In sum, the display device 100 of the present disclosure decreases the unnecessary power consumption by providing the smaller system cross voltage to the display panel 30, so as to decrease the power consumption of the display panel 30 (to decrease by 21% in comparison to the prior art) and the power consumption of the power integrated circuit 10 (to decrease by 34% in comparison to the prior art) dramatically. In addition, the display device 100 and the calibration method 200 of the present disclosure can further prevent the operating point of the driving transistor from entering the linear region after long time operation by adjusting the system cross voltage appropriately, so as to extend the lifetime of the display panel 30.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A display device, comprising:
a display panel configured to receive a system cross voltage and comprising a driving transistor;
a power integrated circuit configured to provide the system cross voltage to the display panel and comprising a current conversion circuit, wherein the current conversion circuit is configured to convert a calibration current outputted by the display panel when displaying a calibration frame into a detection voltage, the calibration frame comprises an image area and a non-image area, at least a portion of pixels in the image area has a data value corresponding to a predetermined gray level which allows an operating point of the driving transistor to enter a linear region, and all of pixels in the non-image area have a data value corresponding to a lowest gray level, wherein when the display device displays the calibration frame with a first size, the image area has a predetermined size, wherein when the display device displays the calibration frame with a second size, the image area has the predetermined size, wherein the second size is different from the first size;
a comparison circuit configured to compare the detection voltage with a threshold to generate a comparison result; and
a selection circuit configured to determine a magnitude of the system cross voltage according to the comparison result;
wherein the power integrated circuit is further configured to correspondingly generate the system cross voltage according to the magnitude of the system cross voltage determined by the selection circuit to provide the system cross voltage determined by the selection circuit to the display panel.

2. The display device of claim 1, wherein the display device further comprises a driver, and the driver is coupled to the power integrated circuit and the display panel and is configured to drive a plurality of pixel circuits of the display panel to emit light according to the calibration current, so that the display panel displays the calibration frame.

3. The display device of claim 2, wherein the display device further comprises a memory circuit configured to store the magnitude of the system cross voltage determined by the selection circuit.

4. The display device of claim 3, wherein the current conversion circuit, the comparison circuit, the selection circuit and the memory circuit are arranged in the power integrated circuit.

5. The display device of claim 3, wherein the current conversion circuit is arranged in the power integrated circuit, and the comparison circuit, the selection circuit and the memory circuit are arranged in the driver.

6. The display device of claim 3, wherein the current conversion circuit and the comparison circuit are arranged in the power integrated circuit, and the selection circuit and the memory circuit are arranged in the driver.

7. The display device of claim 3, wherein the current conversion circuit, the comparison circuit and the selection circuit are arranged in the power integrated circuit, and the memory circuit is arranged in the driver.

8. The display device of claim 1, wherein the power integrated circuit is configured to generate a system high voltage and a system low voltage correspondingly to generate the determined system cross voltage, wherein the system high voltage minus the system low voltage is the system cross voltage.

9. The display device of claim 8, wherein if a minimal absolute value of the system low voltage is not smaller than the system high voltage, the power integrated circuit correspondingly generates the system low voltage by a charge pump circuit and a boost power conversion circuit.

10. The display device of claim 8, wherein if a minimal absolute value of the system low voltage is smaller than the system high voltage, the power integrated circuit correspondingly generates the system low voltage by a charge pump circuit and a buck-boost power conversion circuit.

11. The display device of claim 1, wherein the selection circuit determines that the system cross voltage is a first value when the display device operates in a normal mode and determines that the system cross voltage is a second value when the display device operates in a power saving mode, wherein the second value is smaller than the first value.

12. The display device of claim 1, wherein the power integrated circuit adjusts the system cross voltage from a first value to a second value directly or in a progressive manner, wherein the second value is different from the first value.

13. A calibration method configured to calibrate a system cross voltage of a display device, comprising:
converting a calibration current outputted by a display panel of the display device when displaying a calibration frame into a detection voltage, wherein the calibration frame comprises an image area and a non-image area, at least a portion of pixels in the image area has a data value corresponding to a predetermined gray level which allows an operating point of a driving transistor of the display device to enter a linear region, and all of pixels in the non-image area have a data value corresponding to a lowest gray level, wherein when the display device displays the calibration frame with a first size, the image area has a predetermined size, wherein when the display device displays the calibration frame with a second size, the image area has the predetermined size, wherein the second size is different from the first size;
comparing the detection voltage with a threshold to generate a comparison result;
determining the system cross voltage according to the comparison result; and
correspondingly generating the system cross voltage according to the determined system cross voltage to provide the system cross voltage to the display panel.

14. The calibration method of claim 13, wherein converting the calibration current into the detection voltage comprises:
driving a plurality of pixel circuits of the display panel to emit light according to the calibration current, so that the display panel displays the calibration frame.

15. The calibration method of claim 13, further comprising:
  storing the determined system cross voltage.

16. The calibration method of claim 13, wherein the system cross voltage is that a system high voltage minus a system low voltage, and correspondingly generating the system cross voltage comprises:
  correspondingly generating the system low voltage to generate the determined system cross voltage.

17. The calibration method of claim 13, wherein determining the system cross voltage comprises:
  determining that the system cross voltage is a first value when the display device operates in a normal mode; and
  determining that the system cross voltage is a second value when the display device operates in a power saving mode, wherein the second value is smaller than the first value.

18. The calibration method of claim 13, wherein if it is determined to adjust the system cross voltage from a first value to a second value, correspondingly generating the system cross voltage comprises:
  adjusting the system cross voltage from the first value to the second value directly or in a progressive manner, wherein the second value is different from the first value.

19. A frame display method applied to a display device, comprising:
  during a period that a predetermined operation of the display device is performed, displaying at least one frame;
  in response to a trigger of a cross voltage calibration operation of the display device, displaying a calibration frame before or after displaying the at least one frame, wherein the calibration frame comprises an image area and a non-image area, at least a portion of pixels in the image area has a data value corresponding to a predetermined gray level which allows an operating point of a driving transistor of the display device to enter a linear region, and all of pixels in the non-image area have a data value corresponding to a lowest gray level, wherein when the display device displays the calibration frame with a first size, the image area has a predetermined size, wherein when the display device displays the calibration frame with a second size, the image area has the predetermined size, wherein the second size is different from the first size; and
  stopping displaying the calibration frame after the cross voltage calibration operation is completed,
  wherein the cross voltage calibration operation comprises:
  converting a calibration current outputted by a display panel of the display device when displaying the calibration frame into a detection voltage, wherein the detection voltage is an analog signal.

* * * * *